United States Patent
Mendez

(10) Patent No.: US 11,760,075 B2
(45) Date of Patent: Sep. 19, 2023

(54) WINDOW TINTING TOOL

(71) Applicant: Tri-Edge Industries, LLC, Lake Worth, FL (US)

(72) Inventor: Jay Mendez, Lake Worth, FL (US)

( * ) Notice: Subject to any disclaimer, the term of this patent is extended or adjusted under 35 U.S.C. 154(b) by 92 days.

(21) Appl. No.: 16/899,970

(22) Filed: Jun. 12, 2020

(65) Prior Publication Data

US 2021/0387448 A1 Dec. 16, 2021

(51) Int. Cl.
| | | |
|---|---|---|
| *B32B 37/10* | (2006.01) | |
| *B32B 37/18* | (2006.01) | |
| *B32B 37/00* | (2006.01) | |
| *B65H 37/00* | (2006.01) | |
| *B29C 65/00* | (2006.01) | |
| *B29C 63/02* | (2006.01) | |
| *E04F 21/32* | (2006.01) | |

(52) U.S. Cl.
CPC .............. *B32B 37/10* (2013.01); *B32B 37/18* (2013.01); *B29C 66/861* (2013.01); *B29C 2063/027* (2013.01); *B32B 37/0046* (2013.01); *B32B 2037/109* (2013.01); *B32B 2307/4026* (2013.01); *B32B 2315/08* (2013.01); *B32B 2605/006* (2013.01); *B32B 2605/08* (2013.01); *B65H 37/005* (2013.01); *E04F 21/32* (2013.01); *Y10T 156/1788* (2015.01); *Y10T 156/18* (2015.01)

(58) Field of Classification Search
CPC . E04F 21/32; B29C 2063/027; B32B 37/0046
See application file for complete search history.

(56) References Cited

U.S. PATENT DOCUMENTS

| | | | | |
|---|---|---|---|---|
| 2,043,775 | A * | 6/1936 | Rosen | A47L 1/06 15/245 |
| 2,123,638 | A * | 7/1938 | Steccone | A47L 1/06 15/245 |
| 2,511,346 | A * | 6/1950 | Kennedy | A47L 1/09 15/245 |
| 2,625,700 | A * | 1/1953 | Baldwin | A47L 1/06 15/245 |
| 2,842,789 | A * | 7/1958 | Wells | A47L 13/12 15/245 |
| 2,902,713 | A * | 9/1959 | Buelow | E04F 21/32 30/299 |
| 4,802,280 | A * | 2/1989 | LaPiana | B26B 27/00 30/169 |
| 4,910,825 | A * | 3/1990 | Mauer | A47L 1/08 15/209.1 |

(Continued)

FOREIGN PATENT DOCUMENTS

WO WO2008142221 A1 * 11/2008 ............. B44D 3/164

*Primary Examiner* — Linda L Gray
(74) *Attorney, Agent, or Firm* — Malloy & Malloy, P.L.; Robert M. Downey

(57) ABSTRACT

A tool for applying tint film to an inside window surface of an automobile has a unitary body with a handle portion and a downwardly depending neck extending from the handle portion to an elongate blade supporting portion. The blade supporting portion includes a bottom zone extending to a chamfered distal end. A flexible blade is attached to the bottom zone and the distal end of the blade supporting portion. The flexible blade includes a forwardmost portion that extends beyond the distal end of the blade supporting portion.

1 Claim, 3 Drawing Sheets

(56) References Cited

U.S. PATENT DOCUMENTS

| | | | | |
|---|---|---|---|---|
| 5,175,902 A | * | 1/1993 | Samuelsson | A47L 1/06 |
| | | | | 15/245 |
| D630,812 S | * | 1/2011 | Williams | D32/41 |
| 8,012,280 B1 | * | 9/2011 | Thorpe | B65H 37/005 |
| | | | | 156/267 |

* cited by examiner

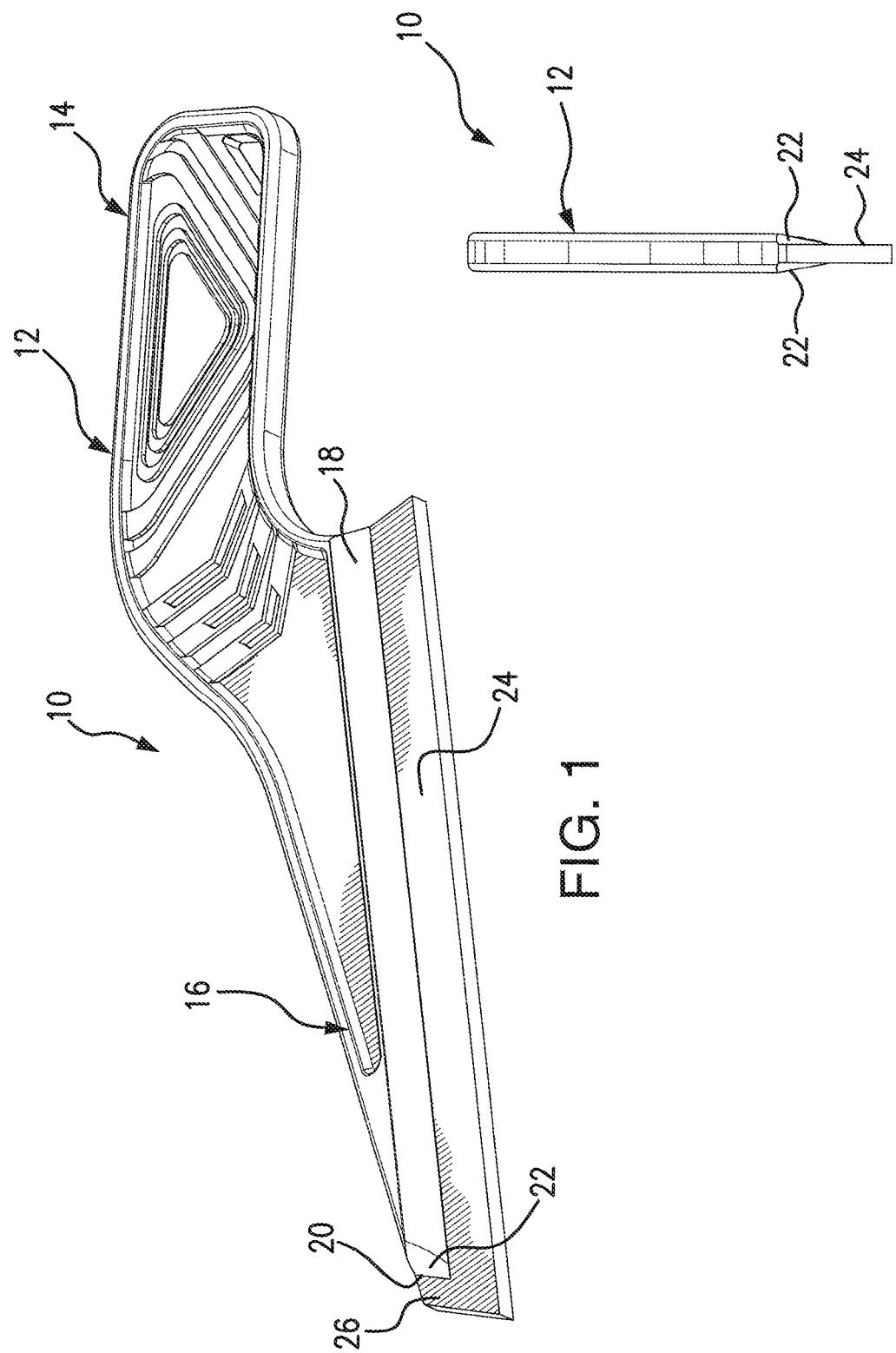

WINDOW TINTING TOOL

BACKGROUND OF THE INVENTION

Field of the Invention

The present invention relates to squeegee tools, and more particularly, to a tool for applying window tint film to glass surfaces, and particularly automobile window surfaces.

Description of the Related Art

The process of applying window tint film to a window typically requires spraying a soapy water solution onto the previously cleaned window surface and then pressing the tint film on the soapy water surface of the window so that the tint film covers the entire window surface area. Thereafter, a squeegee or other tool is used to push the air bubbles and soapy water solution to the edges of the tint film in order to remove the air bubbles and excess solution from between the tint film and the glass, while also removing wrinkles and creases so that the tint film is pressed perfectly smooth against the window surface.

The application of window tint film to automobile windows is a little more challenging due to the varying degrees of curvature of automobile windows. The side windows of an automobile are typically curved to some degree, while the rear window of an automobile is usually curved from top to bottom as well as from side to side. Due to the varying shapes, curvatures and access to automobile window surfaces, a need has arisen for various tools to effectively apply window tint film to the different windows of an automobile. In particular, it can be difficult to access the side edges, bottom edges and corners of automobile windows, and particularly the rear window, when attempting to remove the air bubbles and excess solution along with creases in the tint film so that the tint film is applied perfectly smooth to the glass surface.

The present invention provides a squeegee type tool that is specifically designed for applying window tint film to the inside surfaces of automobile windows without scratching, cutting or damaging the window tint film. Moreover, the squeegee tool of the present invention allows for application of window tint film to the inside surfaces of automobile windows and particularly to areas that are difficult to reach with other window tint applicator tools, such as the corners and side edges of the window.

SUMMARY OF THE INVENTION

The present invention is directed to a tool for applying tint film to an inside window surface of an automobile. The unitary body includes a handle portion, an elongate blade supporting portion and a neck that extends downwardly from the handle portion to the elongate blade supporting portion. The blade supporting portion includes a bottom zone extending from a proximal end to a chamfered distal end. A flexible blade is attached to the bottom zone and the distal end so that a straight primary working edge of the flexible blade is below the bottom zone for direct contact with the tint film on the window surface. The flexible blade includes a forwardmost portion that extends beyond the distal end of the blade supporting portion so that the distal end of the elongate blade supporting portion does not contact the tint film or window surface when using the tool. The forwardmost portion of the flexible blade includes a secondary working edge for contact with the tint film on the window surface. Moreover, the chamfered distal end eliminates an abrupt sharp edge or shoulder that may otherwise inadvertently come into contact with the tint film or window surface during application of the tint film to the window surface. This chamfered distal end helps to prevent unwanted scratching or cutting of the tint film in the application process.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 1 is a side, bottom perspective view of the window tint applicator tool of the present invention;

FIG. 2 is a front elevational view thereof;

Like reference numerals refer to like parts throughout the several views of the drawings.

DETAILED DESCRIPTION OF THE PREFERRED EMBODIMENT

Figure 3:
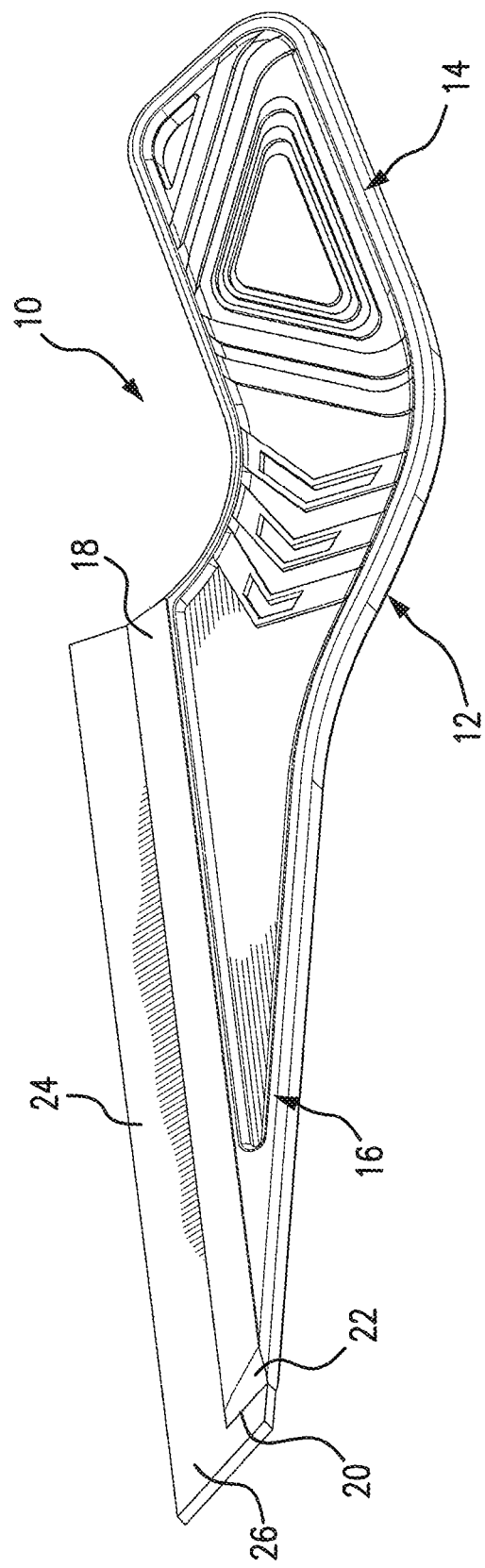
FIG. 3 is a side, top perspective view of the window tint applicator tool.

Referring to the several views of the drawings, the window tint applicator tool is shown and is generally indicated as 10. The tool 10 includes an integrally molded unitary body 12 that may be formed of a plastic composition or other generally rigid material. The unitary body 12 includes a handle portion 14 and an elongate blade supporting portion 16. A neck extends downwardly from the handle portion 14 to the blade supporting portion 16 so that the blade supporting portion is generally below the handle portion 14. The blade supporting portion includes a bottom zone 18 that may be angled on opposite sides of the blade supporting portion to discourage scratching of the tint film when using the tool 10 to apply a tint film to a window surface. As seen in FIG. 1, the bottom zone 18 is entirely below the handle portion 14 so that the user can grasp the handle portion 14 in one hand, with the index finger on or near the bottom zone 18 on one side of the blade supporting portion and the thumb on the top curved edge of the neck and in a manner wherein the user's hand does not contact the tint film or window surface.

The bottom zone 18 extends from a proximal end to a distal end 20. A distal end portion 22 adjacent to the distal end 20 is chamfered, as seen in FIGS. 1-3. A flexible blade 24 is attached to the bottom zone 18 and extends from the rear proximal end of the bottom zone 18 to beyond the distal end 20. The flexible blade 24 includes a straight primary working edge extending the entire length of the flexible blade for contact with the tint film on the window surface. The flexible blade 24 extends beyond the distal end 20 so that a portion of the flexible blade 26, including a secondary working edge, is positioned forwardly of the distal end 20 and chamfered surfaces 22, as seen in FIGS. 1 and 3. This not only allows use of the forward portion 26 of the flexible blade when applying the tint film to the window surface, but also helps to avoid contact of the distal end 20 and the remainder of the rigid unitary body 12 with the tint film and window surface which may otherwise result in scratching or cutting the tint film. The chamfered surfaces 22 on opposite sides of the unitary body, at the distal end 20, also help to prevent contact of the rigid unitary body 12 with the tint film and window surface by eliminating sharp, abrupt edges at the distal end while reducing the overall profile of the distal end portion of the blade supporting portion.

Figure 4:
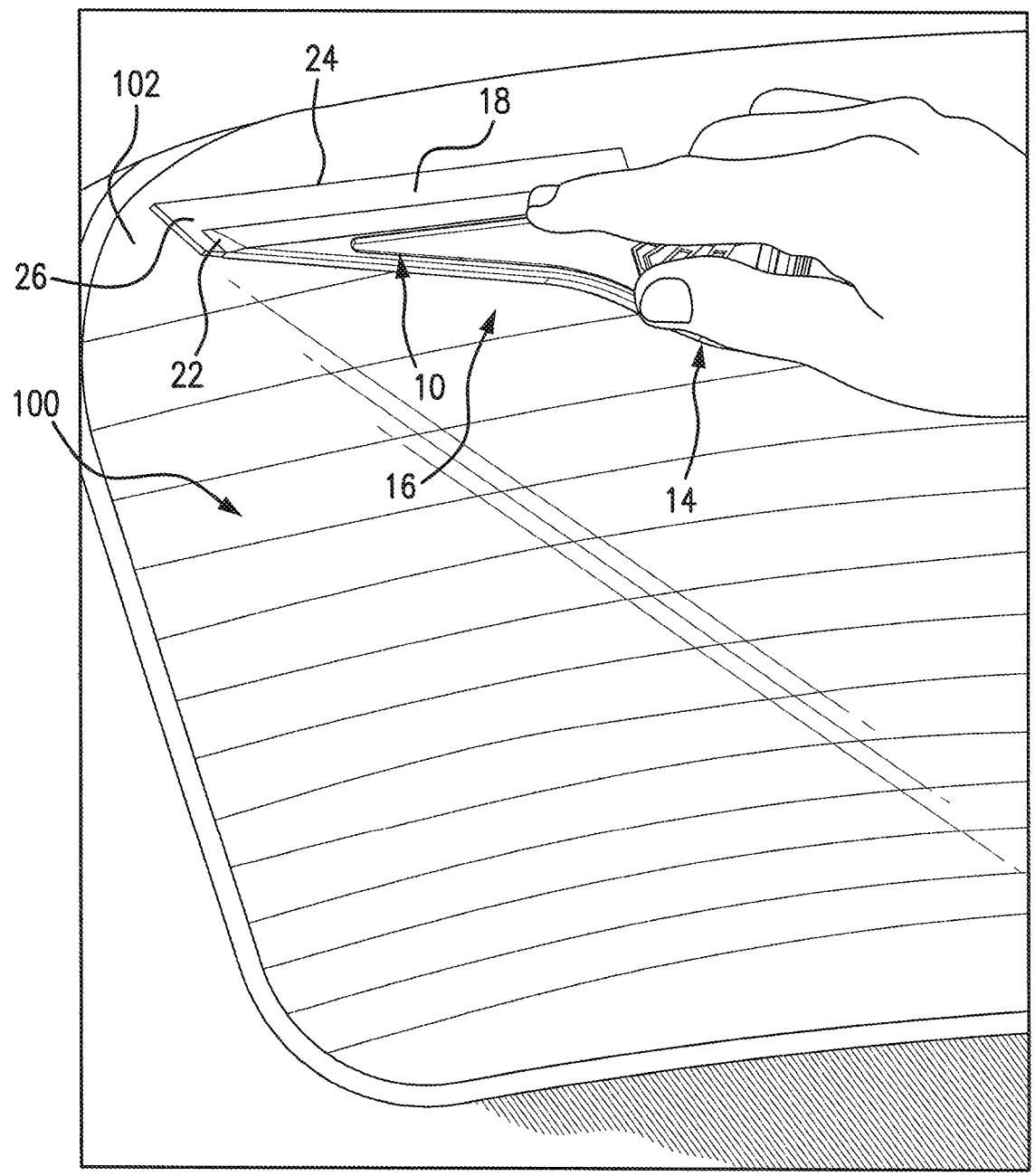
FIG. 4 is a perspective view showing a user grasping the window tint applicator tool of the present invention and reaching to a top corner of the inside of a curved window of an automobile for removing air bubbles and solution from between window tint film and the curved inside window surface while also removing wrinkles and creases in the tint film, particularly near the corner of the automobile window.

Referring to FIG. 4, the window tint applicator tool 10 is shown in use applying window tint film to an inside curved surface of an automobile window 100. In particular, the window tint applicator tool 10 is shown in use to remove air bubbles and solution from between the window tint film and the curved inside window surface of the automobile window 100 at a corner 102 that may otherwise be difficult to reach with another type of squeegee tool. As seen in FIG. 4, the end portion 26 of the flexible blade 24 extends beyond the chamfered distal end portion 22 to thereby allow for full contact of the flexible blade 24, including the primary and secondary working edges, with the tint film in difficult to reach areas, such as the corner 102 of the window 100 without the rigid unitary body of the tool coming into contact with the tint film. FIG. 4 also illustrates a manner of holding the tool 10, wherein the user may place the thumb on the top curved surface of the neck extending from the handle portion 14 to the blade supporting portion 16, while also using the index finger to apply pressure on or near the bottom zone 18 while avoiding contact with the flexible blade 24. The user's other fingers may be wrapped around the underside or bottom of the handle portion 14 without contacting the window surface or tint film.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A tool for applying tint film to a window surface comprising:
    a unitary integral one-piece body having a central vertical plane and including a handle portion, an elongate blade supporting portion below the handle portion and a neck extending from the handle portion and downwardly to the elongate blade supporting portion;
    the blade supporting portion extending from a rear proximal end to a distal end at a forwardmost end of the unitary integral one-piece body;
    the neck having a top curved edge for placement of a user's thumb thereon during use of the tool;
    a flexible blade attached to the blade supporting portion and extending downwardly below the unitary integral one-piece body and along a blade length from the rear proximal end of the blade supporting portion and beyond the distal end of the blade supporting portion, and the flexible blade including a linear primary working edge extending along the entire blade length and a secondary working edge that is forward of and beyond the distal end of the blade supporting portion;
    the handle portion, the neck, and the flexible blade all coplanar to one another on the central vertical plane; and the blade supporting portion includes an angled bottom zone on opposite sides of the blade supporting portion and each said side having a chamfered surface.

* * * * *